United States Patent [19]

Longardner

[11] Patent Number: 4,849,648
[45] Date of Patent: Jul. 18, 1989

[54] COMPRESSED GAS SYSTEM AND METHOD

[75] Inventor: Robert L. Longardner, Indianapolis, Ind.

[73] Assignee: Columbia Energy Storage, Inc., Miami, Fla.

[21] Appl. No.: 88,887

[22] Filed: Aug. 24, 1987

[51] Int. Cl.[4] ............................................. F15B 1/02
[52] U.S. Cl. ........................................ 290/54; 290/43
[58] Field of Search ................ 290/1 R, 43, 52, 54; 60/659

[56] References Cited

U.S. PATENT DOCUMENTS

| | | | |
|---|---|---|---|
| 2,757,067 | 7/1956 | Cornell et al. | 137/7 |
| 3,378,360 | 4/1968 | McFarland | 428/606 |
| 3,597,621 | 8/1971 | Yamada | 290/52 X |
| 3,719,196 | 3/1973 | McJones | 137/110 |
| 3,807,422 | 4/1974 | McJones | 137/12 |
| 3,844,306 | 10/1974 | Hill | 137/296 |
| 3,847,173 | 11/1974 | Hill | 137/110 |
| 3,880,195 | 4/1975 | Goodrich et al. | 138/172 |
| 3,939,356 | 2/1976 | Loane | 290/54 X |
| 3,988,897 | 11/1976 | Strub | 60/682 |
| 4,147,204 | 4/1979 | Pfenninger | 290/43 X |
| 4,150,547 | 4/1977 | Hobson | 60/659 |
| 4,237,692 | 12/1980 | Ahrens et al. | 60/659 |
| 4,248,043 | 2/1981 | Stewart, Sr. | 290/54 X |
| 4,275,310 | 6/1981 | Summers et al. | 290/1 R |
| 4,443,707 | 4/1984 | Scieri et al. | 290/4 R |
| 4,593,202 | 6/1986 | Dickinson | 290/54 |
| 4,612,447 | 9/1986 | Rowe | 290/54 X |

Primary Examiner—William M. Shoop, Jr.
Assistant Examiner—W. E. Duncanson, Jr.

[57] ABSTRACT

A system and method of selectively deployed and utilized compressed air energy storage satellite facilities within an electrical power grid network. The satellite facilities are independent of geological formations and provide means for increasing the load carrying capacity of an electrical power system without increasing the size of the baseload electrical power generation facility or of the power transmission lines. A portion of the compressed gas is circulated back through a compressor located in a gas flow circuit, causing turbulent flow in a series of tanks, thus slowing heat energy loss to the environment. A heat exchanger located in the circuit of gas flow cools the gas while it is being stored, thus reducing the work needed to compress a given mass of gas into the tanks. The system and method utilizes low cost electrical energy produced by a baseload facility during non-peak periods and converts such electricity into potential energy in the form of compressed air. The compressed air is deployed in outlying areas, away from the baseload facility, to provide ready electrical energy during peak demand periods from a location closer to the peak electrical demand consumer. The system and method may also be utilized to boost dropped and/or lagging voltage and/or current to reduce line loss during electrical power transmission.

57 Claims, 7 Drawing Sheets

COMPRESSED GAS SYSTEM AND METHOD

BACKGROUND OF THE INVENTION

This invention relates to the field of electrical power generation, more particularly to the field of power generation using compressed gas storage wherein turbulent gas flow is used to provide more energy efficient storage of compressed gas by reducing the energy gradient inherent to viscous flow.

In the field of electrical power generation, electricity is produced in a variety of ways. Where major demands for electricity exist in a metropolis or other community, large baseload electrical generation facilities are used to generate the electricity. These baseload facilities are often large installations, such as nuclear power plants or coal powered electric plants, costing millions of dollars to construct and being relatively permanent once constructed. Although planning and forecasting go into selecting a site for such a baseload facility, unforeseeable changes in demographics and demand for electricity occur. Such changes can render a baseload facility distant from where the facility's power is needed most.

Furthermore, due to safety concerns and political obstacles, it may not be feasible to locate a baseload facility close to a dense urban area or industrial area needing electricity the most. This is especially true when the baseload facility is a nuclear power plant.

Also, if a city has a power failure, it may have to transmit power in from a neighboring city. Thus, in a power shortage emergency, the electricity transmitted in to alleviate the problem originates from a baseload facility far from the power failure. Significant line losses occur from this long-distance transmission of power.

The power industry has approached this problem by transforming the voltage of electricity generated by the baseload facility to high voltages, and transmitting the high voltage electricity along transmission lines to where the power is needed. In this way, a baseload facility may be located in a suitable location and the power transmitted across the countryside to its ultimate use. High voltages are used in transmission since they result in less wasted energy in the form of line loss than do lower voltage transmissions of the same wattage. However, line losses do occur at the higher voltages, leading to a decay of transmission efficiency over long distances. In order to step up or increase the dropped voltage during transmission, it is often required that the transmission lines be routed to connect with other baseload facilities which will step up the voltage. Such routing may be less than optimal since the step up baseload facility may be located away from the most direct path between the transmitting baseload facility and the end use of the power.

Such limitations in power generation and transmission facilities often become most evident during peak demand periods of the day. These peak demands for electricity typically occur during business hours in business and industrial areas of a community; but the peak demand can shift to outlying residential areas in the evening hours. When electricity demand peaks, the strain on the electrical power system can be great, even leading to blackouts or brownouts. Also, peak demand periods can cause overall system voltage and current drops. These drops can lead to decreased operating efficiency of equipment, such as electric motors and computers designed to operate at a fixed voltage. Other problems from these drops include a need for increased size of protective equipment in the transmission and distribution network, increased transformer KVA ratings, and increased magnetism effects within the transmission conductor.

In addition to shifting peaking demands for electricity, a community may grow, increasing the total demand for electricity. Again, the effects of such demand are greatest during peak demand hours. A community could be faced with the dilemma of choosing between restricting community growth, or constructing additional costly baseload power facilities. The latter would require additional power generation facilities to increase baseload capacity, and additional power transmission facilities to increase transmission load carrying capacity. The present invention affords a community the option of avoiding the capital expense of constructing additional baseload power plants and/or constructing large transmission capacity power lines.

Prior approaches use various means for electrical power generation during peak electricity demand periods known as compressed air energy storage, or CAES systems. One such means is disclosed by U.S. Pat. No. 4,275,310 to Summers and Longardner, showing a peak power generation process in which steam turbines drive air compressors which compress air to be stored in underground geological formations. During peak electricity demand periods, the compressed air is used to drive turbines which turn electric generators. U.S. Pat. No. 4,237,692 to Ahrens and Kartsounes discloses a compressed air energy system for electrical power generation. The compressed gas is stored in one of the "four types of underground reservoirs that are suitable for the storage of compressed air. They are: depleted petroleum fields, aquifers, mined rock cavities, and solution-mined salt cavities." Ahrens, Col. 2, lines 1–4. Other systems are disclosed in U.S. Pat. Nos. 3,597,621, 3,988,897, and 4,443,707.

In the field of compressed gas storage, various arrangements of nesting tanks in parallel arrangement have been used in non-CAES related applications. One such arrangement is illustrated in Hill, U.S. Pat. No. 3,847,173. However, typical gas storage systems lead to energy inefficiencies. When a compressed gas is being pumped into the storage tank, it encounters resident gas in the tank. Resident gas, a relatively still body of gas already in the tank, acts somewhat like a wall, against which newly entering compressed gas is recompressed. Likewise, the resident gas is recompressed. This recompression inside the storage tank causes localized temperature rises in the gas due to the work of recompression done on the gases. Such temperature rises cause a higher temperature differential between the gas and the surrounding environment, thus causing greater heat loss to the surrounding environment. This heat energy loss leads to energy inefficiencies in the overall gas compression and storage system.

The prior system, as seen in Hobson, U.S. Pat. No. 4,150,547, has indirectly addressed this problem by surrounding the gas storage vessel with thermal insulation in order to slow the heat transfer to the surrounding environment.

The present invention improves the efficiency of gas compression and storage systems by reducing heat loss to the surrounding environment. Heat loss is reduced by reducing localized temperature rises in the gas storage tanks. This is achieved by introducing a turbulent flow of gas through the storage tanks during the time the tanks are being filled. This turbulent flow is achieved by bleeding or circulating a portion of the compressed gas out of the tank while the tank is being filled. The result is a turbulent flow of gas through the tank during filling which mixes gas in the tank. This mixing of gas causes heat of recompression and other heat energy to be more evenly distributed throughout the tank. Although the net heat energy in the tank remains approximately the same due to the circulating, localized temperature rises, or hotspots, are reduced or eliminated. As such, localized regions of heat transfer to the surounding environment are reduced, thus decreasing energy loss from the system. Furthermore, heat exchangers may be used to cool the circulating gas during filling of the tanks.

Under certain conditions, savings in lost energy are greater when the gas is not stored for long time periods. Over long time periods, assuming the environment surrounding the storage tank is cooler than the compressed gas, heat energy will be lost to the environment. This is true even if turbulent flow in the tank evenly distributes the heat energy in the tank. However, evenly distributed heat energy will lead to a lower temperature differential with the environment at localized hot spots. A lower temperature differential will result in a slower rate of heat loss to the environment. Thus, the present invention is especially suitable to take advantage of this slowed rate of heat loss. The present invention has particularly good application in the area of compressed air energy systems used for peak period electrical energy generation where storage periods are typically less than twenty-four hours.

The compressed gas removed from the tank during filling is either circulated to the compressor train or bled for use elsewhere. When the gas is circulated, it is injected back into the compressor train which originally compressed the gas for storage. Typically, such circulated gas is injected into a low or intermediate pressure compressor stage in a multi-stage compressor train. The circulated gas is then further compressed in a higher pressure stage of the multi-staged compressor and then pumped back into the tank.

The present invention may, instead of circulating compressed gas back to the compressor train which originally compressed the gas, use the compressed gas elsewhere in another device requiring compressed gas. When the gas is bled for use elsewhere, the gas is employed in a means other than the original compressor train. Typically, this use is to drive a turbine engine or to be further compressed in a second compressor train distinct from the original compressor train. Furthermore, when such gas is used to drive a turbine engine, such turbine engine may be used to drive the original compressor train.

Turbulent gas flow through the gas storage vessel is enhanced when the storage vessel comprises a plurality of elongated needle tanks connected in series, through which the compressed gas flows along a flow path. The gas is circulated or bled at the end of the flow path in the series of needle bottles.

Another advantage of the present invention is that it provides an arrangement to reduce the dynamic shock on a gas storage system when highly compressed gas is introduced into the system. The shock created by introducing gases at pressures higher than residual pressure in the system at 2000 p.s.i. and greater can stress the joints, valves, and other parts of a compressed gas storage system. The present invention can help to relieve such stress on the system, prolonging system integrity.

Although the series arranged tanks may be used in any variety of applications needing a supply of compressed gas, a preferred use of the present invention is to employ it in compressed air energy storage systems. Such systems can be used to supplement electrical power generation, especially during peak electric demand periods of the day.

The present invention is an advance over the prior art in that it provides for increased power generation to boost a system's peak load capacity without having to increase the baseload capacity of the baseload electrical power generation facility and without having to increase the transmission load capacity of the transmission lines. The present invention also provides means for stepping up voltage to eliminate line loss occurring during power transmission. These and other advantages are accomplished by locating satellite power facilities on an electrical power grid and apart from a baseload facility. By selectively locating the satellite power facility near an area of peak electricity demand and by coordinating operation of the baseload facility and the satellite power facility in synchronization with the cycles of peak and non-peak electricity demand, the present invention can meet increases in peak electricity demand. Energy can be generated in the form of electricity, transmitted to the satellite power stations at non-peak electricity demand periods, such as the middle of the night, stored as potential energy at the satellite power stations in the form of compressed air in large needle tanks independent of geological formations, converted from compressed air back into electrical energy using a turbine engine driving a generator, and then distributed to electricity consumers closer to the satellite power station.

In this way, energy can be transported or transmitted to outlying areas during the night when demand is low and the transmission lines have surplus load capacity. Also, many baseload facilities perform at optimal efficiency when they are operating close to capacity. Since many of the baseload facilities are not operated close to capacity during low demand periods, during such periods the opportunity to enjoy this optimal efficiency is lost. This is especially true of nuclear power plants.

In the present invention, the satellite power facilities increase the demand for electricity during the night hours. Thus, during night operations (non-peak demand periods), since output is increased, greater efficiencies in operating the baseload facility are realized. The result is that the system begins the next peak period with efficiently generated surplus energy. Furthermore, the energy is already distributed across the grid network, ready and located to be utilized.

Another advantage of the present invention is that electrical energy may be dispatched upon demand to offset peak loads that may spike the system, such as gas turbine starting packages, electric electrode furnaces or system outages due to apparatus failure.

Another advantage of the present invention is that it may be used to replace or supplement power normally provided by equipment which is off-line for maintenance, repair or replacement.

Another advantage of the present invention is that the satellite power facilities are much easier to locate in a given area than a baseload facility or a geologically dependent CAES system. Also, the satellite power facilities are virtually pollution free, pose no danger of nuclear meltdown and can occupy much less space than a baseload facility. Thus, it is easier to selectively deploy a satellite power facility near a high electricity demand area to boost peak power during peak demand periods. Also, due to the present invention's independence from geological formations, it is technologically feasible to locate a satellite facility almost anywhere. The benefits of the present invention are best realized when the geographic distance between baseload facility and satellite power facility is greater than about twenty statute miles. However, benefits of the present invention may also be realized using shorter distances.

In addition to locating the satellite power facilities along a grid network of a community, satellite power stations may be located along a series of electrical transmission lines. As described above, surplus electrical energy generated during low demand periods can be used to recharge the compressed air storage tanks at the satellite power facility. During high or peak demand periods, the compressed air is used to generate secondary electrical energy. This energy is used to step up the voltage which is being transmitted along lines from a baseload facility. The primary electrical energy generated by the baseload facility is partially dissipated during transmission due to impedance in the transmission lines and equipment. Thus, the present invention boosts or steps up the dropped voltage and lagging current. This power factor management is especially useful where transmission distances are long, even reaching distances of twenty, fifty or even several hundred miles. By locating the satellite facility along the transmission lines where the current is lagging the voltage, the impedance in the line is reduced by using a synchronous alternator at the satellite facility to reduce or eliminate the lag. This results in the downsizing of apparatus and/or improving upon the efficiency of existing apparatus and lines, such as transformers, protective equipment, protective relays, capacitors, and electric motors. This allows transmission (and also distribution) voltages to be maintained without relying on transmission interties or load shedding techniques. Also, when the current is out of phase with the voltage, this lag causes undue magnetism around the transmission lines. By reducing or eliminating this lag, the present invention reduces the adverse environmental effects caused by the magnetism.

The present invention also provides a convenient means for conversion of alternating current to direct current or vice-versa. By using an alternating current motor to drive the air compressor, and by using a direct current generator, the CAES system of the present invention may be used to convert AC power to DC power. Conversely, the present invention may employ a direct current motor and an alternating current generator to convert DC power to AC power.

SUMMARY OF THE INVENTION

A compressed gas storage system according to one embodiment of the present invention comprising a gas storage circuit having means for storing compressed gas in the circuit and having an inlet through which the circuit is filled with gas; a first compressor located along the circuit and adpated and arranged to circulate compressed gas around the circuit.

Accordingly, an object of the present invention is to provide an improved compressed gas system and method.

These and other related objects and advantages of the present invention will be apparent from the following description.

DESCRIPTION OF THE PREFERRED EMBODIMENT

Figure 1:
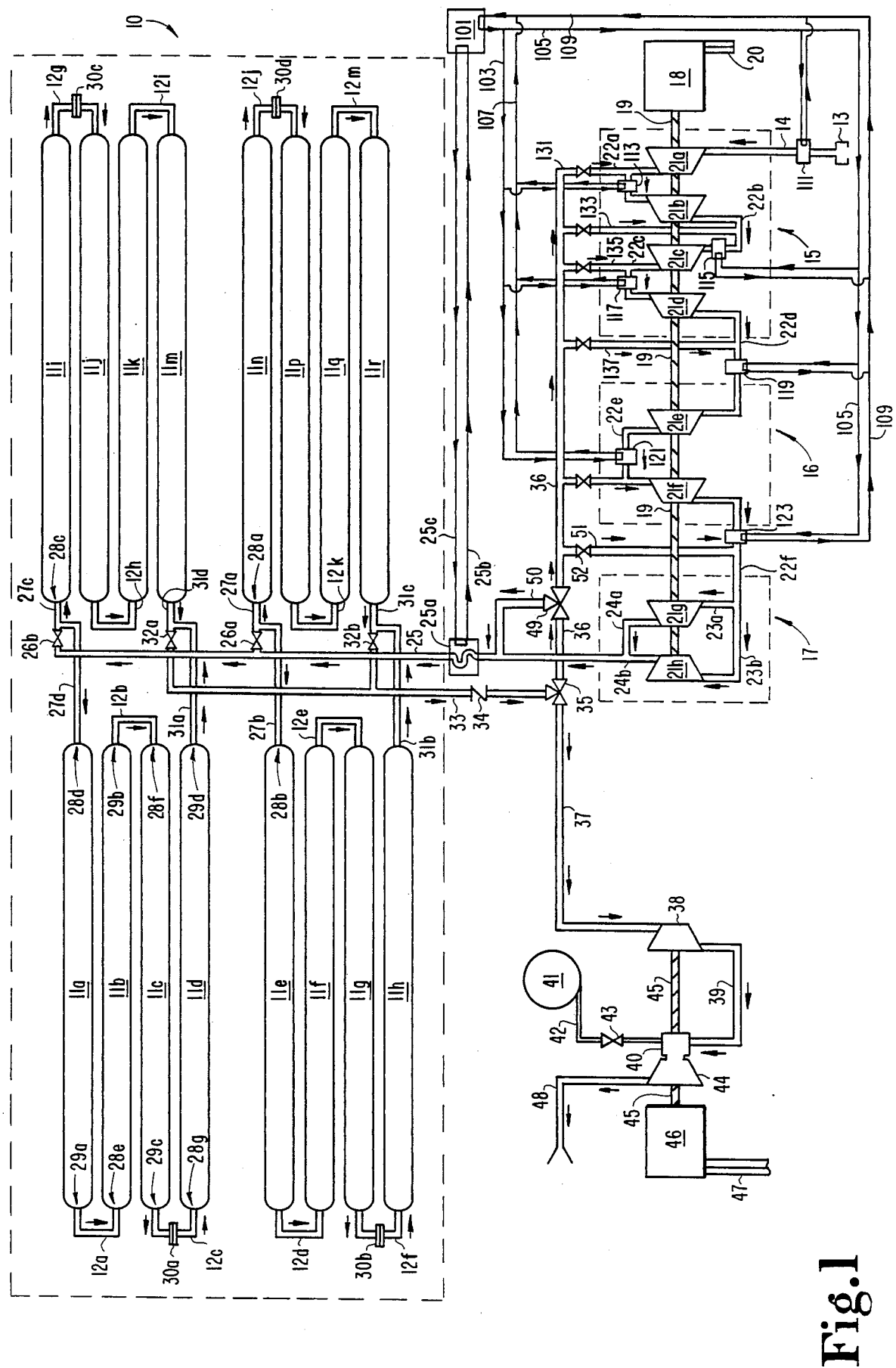
FIG. 1 is a schematic diagram of a satellite facility of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, gas storage system 10 includes storage tanks 11a, 11b, 11c, 11d, 11e, 11f, 11g, 11h, 11i, 11j, 11k, 11m, 11n, 11p, 11q and 11r. Although the embodiment in FIG. 1 illustrates a gas storage system 10 having 16 storage tanks, the present invention may employ more or less storage tanks. The storage tanks are nested in four sets of four tanks. A set of tanks comprising tanks 11a–d are interconnected in series by tank connection lines 12a, 12b and 12c. This set of tanks and tank connection lines is in parallel with other sets of tanks and lines in series, such as tanks 11i, 11j, 11k, 11m, and lines 12g, 12h, and 12i. The other sets of tanks are connected in series by tank connection lines 12d, 12e, 12f, 12j, 12k and 12m. In the preferred embodiment, the tanks are large, measuring approximately 4 feet in cross sectional diameter and 40 to 1000 feet long, depending on site and design considerations. The tanks are constructed of a composite wrap martinsite steel produced by the Inland Steel Company, having headquarters in Chicago, Illinois. The composite wrap tanks are made in accordance with the disclosures in U.S. Pat. No. 3,880,195 to Goodrich and U.S. Pat. No. 3,378,360 to McFarland, both of which are hereby expressly incorporated by reference. The martinsite wrapping is 0.060 inches thick and 1.60 inches wide. The tanks are capped tubes, the caps being welded in place with a martinsite wrap along the seam (see FIG. 9).

Gas to be stored enters the intake filter 13 and is typically air at ambient conditions. After the gas to be compressed enters the intake filter, it passes through the intake line 14 into the initial compression stage 15. The initial compression stage 15 is part of the overall compressor train also made up of the first compression stage 16, the second compression stage 17, the drive motor 18 and the drive shaft 19. The drive motor 18 in the preferred embodiment is an electric motor powered by electric power grid 20. However, drive motor 18 could comprise any means for delivering mechanical energy to be used by a compressor train including a steam turbine engine, a gas turbine engine, an internal combustion engine, or any equivalence thereto. In the initial compressor stage 15, there are compressors 21a, 21b, 21c and 21d. Each of these individual compressors 21a-d make the initial compression stage 15 a multi-stage compressor train in and of itself. First compression stage 16 includes compressors 21e and 21f. Compressors 21e and 21f make first compression stage 16 a multi-stage compressor train in and of itself. Second compression stage 17 includes compressors 21g and 21h and also make second compression stage 17 a multi-stage compressor train in and of itself. Compressors 21a-h typically are dynamic compressors, such as those manufactured by Ingersoll-Rand Corporation, and are coupled with drive shaft 19, which delivers rotary power from the drive motor. Compressors 21a-f are interconnected in series by interstage connector lines 22a, 22b, 22c, 22d and 22e, which couple the gas discharge of each compressor with the gas intake of the next compressor. Compressor 21f is connected to the second compression stage 17 in series by interstage connector line 22f, which branches in parallel to final compressor feed lines 23a and 23b. Final compressor feed lines 23a and 23b supply gas to compressors 21g and 21h, respectively. Thus, a gas to be compressed enters in the intake filter 13 to be compressed to progressively higher degrees of compression through a series of gas compressors 21a-h. Note that, although in the embodiment shown in FIG. 1, drive shaft 19 drives each of the compressors 21a-h, it is not essential to this invention that the compressors be driven by any singular drive motor 18 or drive shaft 19. Drive shaft 19 may be geared in different ratios (not shown) to couple the rotary action from the various compressors.

Compressed gas flows out of compressors 21g and 21h through the second stage gas discharge lines 24a and 24b and into the injection line 25. Line 25 has heat exchanger 25a located therein to remove heat energy from the compressed gas coming out of the compressor train. Coolant supply line 25c provides a liquid coolant, water in the preferred embodiment, to the heat exchanger. The heat exchanger also acts to remove heat caused by recompression of gas in the storage tanks while they are being filled. This acts to cool the gas in storage, requiring less work to compress a given mass of gas into the tanks. The coolant is heated from the heat energy of the gas and then returned in the return line 25b to a heat removing device, such as absorption chiller 101, which uses the heat energy from return line 25b to provide refrigeration for use elsewhere.

The absorption chiller is optional, but is believed to improve the performance of the present invention. This absorption chiller is commercially available from manufacturers, such as Trane air conditioning division of the Trane Company of La Crosse, Wis. This refrigeration may be used to pre-cool and dehumidify incoming gas in intake line 14, as well as to inter-cool compressed gas flowing through interstage connector lines 22a-f. This precooling and intercooling with chillant from an absorption chiller occurs using heat exchangers, such as heat exchanger 25a, along the lines 14 and 22a-f. Use of such absorption chiller is also disclosed in my pending U.S. Patent application Ser. No. 915,791, and is hereby incorporated by reference.

The chillant system includes the absorption chiller, as well as chillant supply lines 103 and 105, and chillant return lines 107 and 109. The supply and return lines supply, in parallel, a flow of water coolant to pre-cooler 111, and to inter-coolers 113, 115, 117, 119, 121 and 123. Alternatively, cooling from an evaporative cooling source, such as a cooling tower, may be provided. The pre-cooler and inter-coolers are heat exchangers, similar to heat exchanger 25a, and cool the gas flow through the system. Parallel supply and return branches (as shown in FIG. 1) connect these heat exchangers with the coolant supply and return lines.

Compressed gas from the injection line 25 flows into the compressed gas storage system 10 for storage. Typically, such gas is stored during low electricity demand periods to later be used during high electricity demand periods. Pressure in the injection line 25 can reach 2,000 p.s.i. and higher, and enter the compressed gas storage system at a temperature ranging from 60° F. to 150° F., with an optimum temperature believed to be about 85° F. As the compressed gas travels through injection line 25, valves 26a and 26b are open to allow the compressed gas to flow through inlet lines 27a, 27b, 27c and 27d. The compressed gas flows from inlet line 27a into gas storage tank 11n through inlet 28a. Compressed gas flows from inlet line 27b into gas storage tank 11e through inlet 28b. Compressed gas flows from inlet line 27c into tank 11i through inlet 28c. Compressed gas flows from inlet line 27d into tank 11a through inlet 28d.

As discussed above, FIG. 1 illustrates four sets of four tanks nested together and connected in series. The set consisting of tanks 11a-d are used to describe the flow of compressed gas through a series of tanks. The description of flow through tanks 11a-d is substantially the same as in the other three sets of four tanks 11e-h, 11i-m and 11n-r and is not repeated for each set of tanks. Rather the description of flow through tanks 11a-d is incorporated as applying to the other three sets of four tanks. In tank 11a, the compressed gas enters at inlet 28d. Tank outlet 29a is an opening through which the compressed air entering through inlet 28d may exit tank 11a. Thus, the compressed gas flows through tank 11a along a flow path (not shown). This flow is turbulent in nature, causing a mixing of the gases in tank 11a. Note however, the flow rate through outlet 29a is less than the flow rate through inlet 28d. Thus, a pressure differential or pressure gradient is developed between inlet line 27d and tank connection line 12a. Furthermore, due to the flow rate differential between inlet 28d and outlet 29a, compressed gas accumulates in tank 11a, thus filling it with compressed gas. After leaving outlet 29a, the compressed gas passes through tank connection line 12a and through inlet 28e into tank 11b. Again, turbulent flow of the gas through tank 11b is achieved. Again, also, there is a pressure differential between tank connection line 12a and tank connection line 12b. The gas continues to flow in series through outlet 29b into tank connection line 12b and into tank 11c by way of inlet 28f. The gas flows through tank 11c through outlet 29c into tank connection line 12c. Expansion valve 30a is located along tank connection line 12c to restrict the flow of compressed gas through tank connection line 12c. Note that expansion valves 30b, 30c and 30d perform similar functions along their respective tank connection lines. Expansion valves 30a–d include orifices to restrict the flow of compressed gas through the tank connection lines. These orifices are typically fixed. Typically, the orifices are standard off-the-shelf fixed orifices such as ones available from Fisher & Porter Company of Warminster, Pennsylvania. Note that in the preferred embodiment, the orifices are of decreasing size along the flow path of the compressed gas through the series of tanks, helping to create a pressure gradient along the series of tanks. Furthermore, expansion valves, such as 30a, and/or orifices may be located along any of the several tank connection lines 12a–m and may include flow meters and/or pressure meters.

The compressed gas flows from tank connection line 12c through inlet 28g into tank 11d. After turbulent flow through tank 11d, the gas exits at outlet 29d into gas exit line 31a. Note that in the series of tanks 11a, 11b, 11c, and 11d, tank 11a constitutes an intake tank and tank 11d constitutes a discharge tank.

Tanks, such as tank 11a are, in the preferred embodiment, elongated needle tanks. Due to the tanks elongation, they have longitudinal ends opposite of each other, such as the ends of tank 11a shown near inlet 28d and outlet 29a.

Gas exit lines 31b, 31c and 31d perform substantially the same function as gas exit line 31a. The gas in gas exit line 31a combines with the gas in gas exit line 31d and passes through exit valve 32a. Note that gas exit valve 32b performs substantially the same function as gas exit valve 32a, that is, to provide a valve to shut off or restrict flow exiting from the gas exit lines 31a–d. The gas flowing through exit valves 32a and 32b flows into the compressed gas return line 33. Check valve 34 is located along compressed gas return line 33 and check valve 34 is oriented so as to allow the flow of compressed gas away from the compressed gas storage system 10, but not to allow a flow of compressed gas toward the compressed gas storage system. The gas in the compressed gas return line flows into the circulation valve 35. In the embodiment shown in FIG. 1, the circulation valve 35 is a three-way valve allowing a flow of compressed gas to be shut off, or to flow from compressed gas return line 33 into the circulation line 36, or to allow gas flow from the compressed gas return line into the turbine train line 37.

The compressed gas flowing in the circulation line 36 is at a lower pressure than the compressed gas flowing in the compressed gas supply line 25 due to the pressure drop gradient across the series of tanks, tank connection lines, and orifices in the compressed gas storage system. Three-way valve 49 is opened to allow the compressed gas in the circulation line 36 to enter the first compression stage 16. Circulation line 36 is coupled with the interstage connector line 22e. The three-way valve 49, in this mode, prevents compressed gas from flowing into secondary line 50. In this way, the compressed gas in circulation line may be combined with compressed gas traveling in series along compressors 21a–h at a point in the compressor series having a comparable pressure to the gas pressure in the circulation line. Thus, reverse flow in the circulation line 36 is reduced or eliminated by the positive pressure head. The compressed gas from the circulation line, which combines with the gas in interstage connector line 22e, is further compressed in compressors 21f, and 21h or 21g. From that point, the compressed gas resumes the previously disclosed circuit in the compressed gas storage system. This circulating circuit between the compressor train (initial compression stage 15, first compression stage 16, and second compression stage 17) and the compressed gas storage system 10 creates a dynamic cycle of flowing compressed gas while compressed gas is being filled in the gas storage tanks 11a–r. In the inventor's best mode, it is believed that the disclosed system performs optimally when the ratios of mass flow rates between the compressed gas supply line 25 and the compressed gas return line 33 is approximately 10:1 during initial stages of filling the storage tanks, and progressively moves to approximately 100:1 during the final stages of filling.

Alternatively to flowing the compressed gas in to interstage connection line 22e, the compressed gas may be routed into interstage connection line 22f by way of secondary circulation line 51 by opening valve 52. In this way, the compressed gas may be circulated into a higher pressure compression stage as the pressure in compressed gas storage system 10 increases above the pressure in interstage connection line 22e.

Similarly, gas recirculated from the storage means can be routed through secondary circulation lines 131, 133, 135 or 137, respectively, as the pressure in storage means increases during filling. Each of these four optional lines includes a valve, similar to valve 52, to allow progressive opening and closing of the secondary circulation lines as the pressure in the storage means increases.

Also, the compressor train may be by-passed by routing the compressed gas through secondary line 50 by closing off the portion of line 36 downstream of valve 49 and opening a flow path to line 50. In this way, compressed gas is communicated directly back to compressed gas storage system 10, by-passing the compressor train. This allows the gas storage system to achieve pressure equilibrium more rapidly.

Note that in FIG. 1, the arrows in the compressed gas flowlines indicate the direction of compressed gas flow during operation of the system of the present invention.

An alternative summary of the gas flow cycle is as follows. After compressed gas flows through compressors 21a–e, the gas enters a circuit. The circuit is a series of compressors, lines, valves and tanks, around which some or all of the compressed gas will flow during filling of the circuit. The circuit is filled with compressed gas at an inlet formed by the junction of interstage connector line 22e and circulation line 36. The circuit continues into compressor 21f, and then around through lines 22f, 23a, 23b, compressors 21h and 21g, lines 24a, 24b, 25, gas storage system 10, line 33, valves 34, 35 and 36, and then back to line 36. The portion of the circuit within gas storage system 10 follows the pattern described above, with several subcircuits in parallel with each other as defined by the four paths through the four sets of four tanks. Heat exchanger 25a serves to cool gas flowing through the circuit, removing heat due to compression in the compressor train and due to recompression in the tanks. The circuit may be routed through line 51 by opening valves 49 and 52 accordingly. Such rerouting of the circuit is done as the pressure in the gas storage system increases. Earlier in the filling cycle, lines 131, 133, 135 and 137 may be progressively opened and closed as the pressure in the system increases.

In addition to or alternatively to allowing the compressed gas to flow through circulation line 36, the compressed gas may be flowed through the circulation valve 35 to the turbine train line 37. The compressed gas flows from turbine train line 37 into turbo-expander 38 which converts the potential energy in the compressed gas into rotary mechanical energy by expanding the compressed gas across turbine blades (not shown). The compressed gas then flows through the interturbine connector line 39 and into combustion chamber 40. The compressed gas is mixed with combustible fuel from fuel tank 41 in the combustion chamber 40 where it is combusted. The fuel is delivered from fuel tank 41 through fuel line 42 having fuel valve 43 to regulate fuel flow. The fuel is typically natural gas or other fuels, such as JP-4 jet fuel. The combusted fuel and compressed gas in the combustion chamber 40 drives the combustion turbine 44, creating further rotary mechanical energy. The combustion turbine is preferably a 501-T3B gas turbine engine offered by Allison Gas Turbine Operations Division of General Motors Corporation, of Indianapolis, Ind. Drive shaft 45 is driven by both the turbo-expander 38 and combustion turbine 44. Drive shaft 45 may be geared in different ratios (not shown) to couple the rotary action from turbo-expander 38 and combustion turbine 44. Drive shaft 45 in turn drives electromagnetic generator 46 which generates electricity transmitted across electrical power grid 47. Exhaust gases from the combustion turbine 44 are discharged to the atmosphere through the exhaust discharge 48, or routed to chiller 101 for producing refrigeration. This refrigeration may be stored as ice or a chilled water sink to augment the management of refrigerant during the operation of the system. The generation is typically operated at peak electrical power demand periods to supplement energy requirements.

Figure 2:
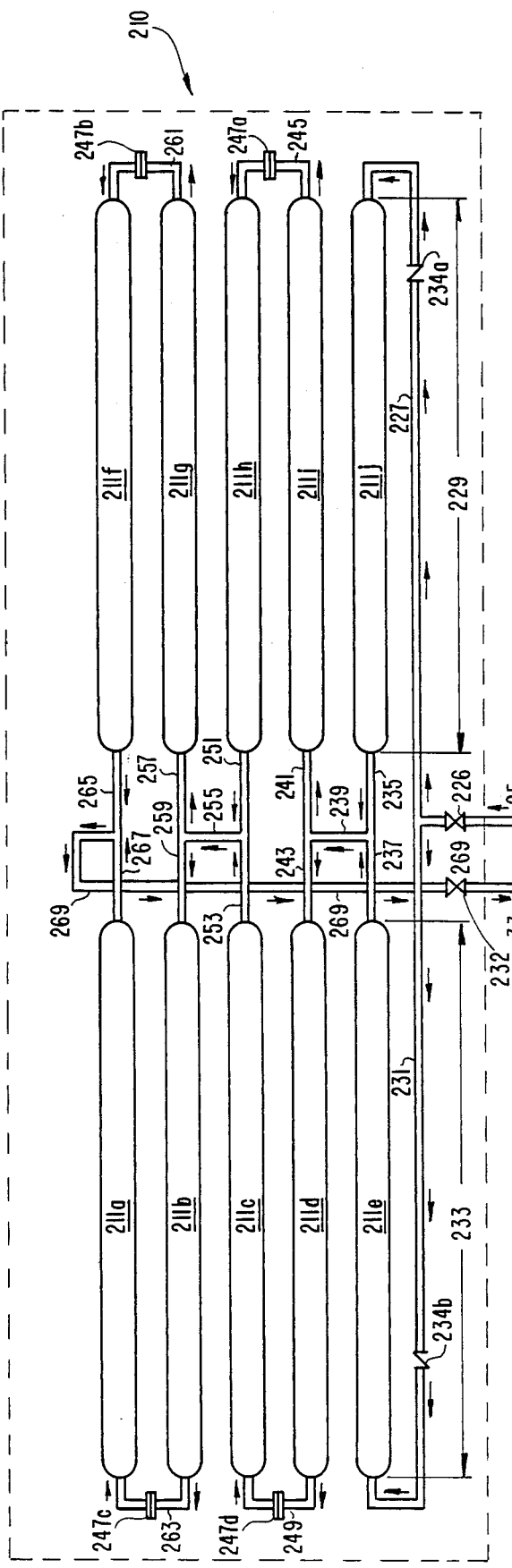
FIG. 2 is a partial schematic diagram of an alternative embodiment of a satellite facility of the present invention.

Referring now to FIG. 2, an alternative embodiment of a portion of the present invention is shown. The storage system 210 is a best mode alternative layout to storage system 10 shown in FIG. 1; and is considered the best made for such storage system. Most notably, gas storage tanks 211a-j are in axial alignment with a corresponding gas storage tank. This is primarily to offset mechanical stresses and strains in the tanks and the lines connecting the tanks due to forces acting on and in the tanks. This axial alignment will help to reduce manifold forces from damaging the gas storage system. For example, tank 211a is axially aligned and oppositely disposed from tank 211f. Likewise, tank 211b is opposite of tank 211g and so forth. Compressed gas is provided to the gas storage system from injection line 25 and travels through valve 226 into injection lines 227 and 231. The gas flow rate through lines 231 and 227 are substantially equal and in opposite directions. Note that tanks 211a-e have a tank length 233, and tanks 211f-j have a tank length 229. Tank lengths 233 and 229 are substantially equal, thus giving symmetric and equal pipe and tank lengths across which flow induced friction will result. Since the lengths are substantially equal, the frictional forces are substantially equal. Since the forces are substantially equal and in an opposite direction, they will effectively offset each other.

Gas flows from line 227 into tank 211j. Note that backflow is prevented in line 227 by check valve 234a. Likewise, check valve 234b prevents backflow towards injection line 25. Compressed gas flows from tank 211j into lines 235 and 239 and then into either or both of lines 241 and 243. From line 241, the compressed gas flows into tank 211i and into line 245. Line 245 contains orifice 247a, which is a standard off-the-shelf orifice, and/or flow meter substantially similar to expansion valve and/or orifice 30a shown in FIG. 1. The gas then flows into tank 211h and then into lines 251 and 255. Next, the gas flows into either or both of lines 257 and 259, gas from line 257 flowing into tank 211g. Gas is communicated from tank 211g to tank 211f through line 261. Line 261 includes orifice 247b which is substantially similar to orifices 247a, 247c and 247d. Compressed gas then exits tank 211f through line 265 and into line 269. The compressed gas in line 269 flows through valve 232 when such valve is open and exits the gas storage system 210 at which point line 269 becomes compressed gas return line 33, as shown in FIG. 1

The flow path of compressed gas through tanks 211f-j is essentially the mirror image of the flow path of gas through tanks 211a-e. The description of the flow path through tanks 211a-e is not repeated, other than to state that the compressed gas flows through lines 231, 237, 239, 243 and/or 241, 249, 253, 255, 259 and/or 257, 263, 267, 269, and through tanks 211a-e, and through orifices 247c and 247d, as shown by the flow arrows in FIG. 2.

The manifold forces which potentially cause damage in the piping and manifolds and tanks of the present invention primarily originate from several sources, such as viscosity strains, forces due to momentum change, forces due to friction, and forces due to air pressure. By axially aligning the tanks and lines as illustrated in FIG. 2, eccentricity is minimized in the tank and line structures, reducing the bending stresses in such equipment. Instead, for example, lines 241 and 243 are in axial tension during portions of the compressed gas filling phase of the present invention, due to the symmetric and axial alignment of tanks 211d and 211i. Similarly, lines 253 and 251 are axially aligned and positioned to exert compressional forces offsetting one another.

Figure 3:
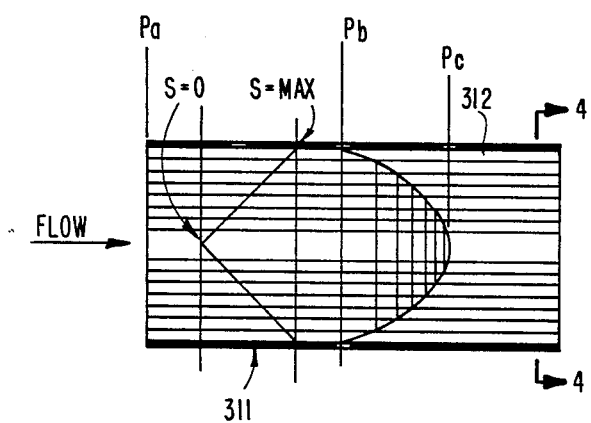
FIG. 3 is a flow diagram of a viscous compressible fluid along a longitudinal cutaway of a cylindrical container along line 3—3 of FIG. 4.
Figure 4:
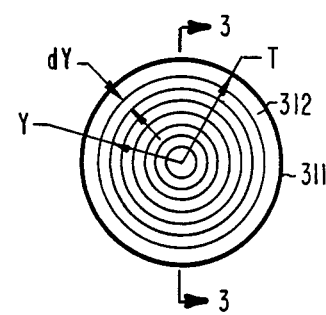
FIG. 4 is a flow diagram of a viscous compressible fluid along a cross-sectional cutaway of a cylindrical container along line 4—4 of FIG. 3.

Referring now to FIGS. 3 and 4, theoretical flow diagrams of viscous compressible fluids are shown. FIG. 3 illustrates a typical cross-section along a gas storage tank, such as tank 11a. FIG. 4 shows a cross-section as seen as line 4—4 of FIG. 3. In FIG. 3, the flow direction is indicated by the "FLOW" arrow, with a datum pressure of $P_a$. The parabolic profile seen in FIG. 3 between $P_b$ and $P_c$ corresponds to the pressure gradient existing in a dynamic flow state across the diameter of the storage tank 311. Outer laminar layer 312 is adjacent to tank 311 and is the laminar layer in which the friction, due to laminar adhesion, is the greatest. Conversely, the centerline flow in tank 311 is the theoretical area of lowest friction. As seen in the point indicated $S=0$, the centerline flow has a shearing stress of 0 at the centerline of flow. The shearing stress increases closer to the wall of tank 311 until the point of maximum shear, $S=Max$, is reached at the tank wall.

FIG. 4 illustrates annular laminar zones, such as laminar layer 312. As one moves from the center of tank 311 radially outwards along the tank radius T, the stress gets greater, as seen by incremental stress dY. Shear stress increases along shear gradient Y. Along the interior of tank 311 at the very boundary layer, the compressed gas remains essentially fixed by adhesion.

The present invention introduces turbulence in tank 311, thus disrupting the laminar flow as depicted in FIGS. 3 and 4.

Figure 5:
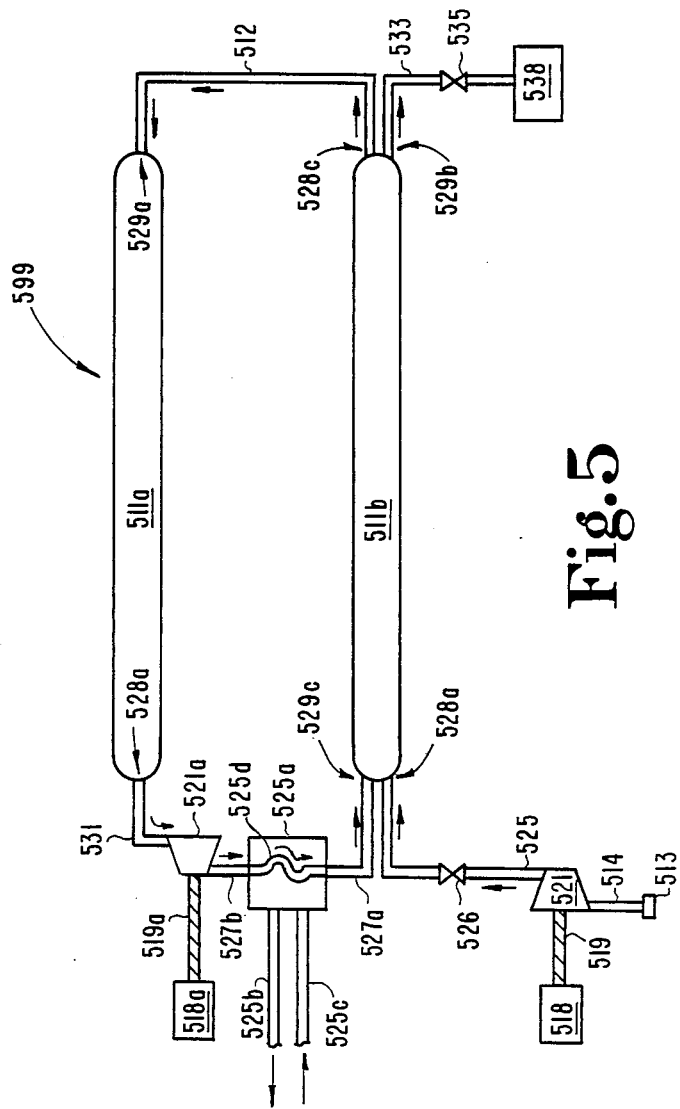
FIG. 5 is a schematic diagram of a second alternative embodiment of a satellite facility of the present invention.

Referring now to FIG. 5, tanks 511a and 511b are elongated needle tanks connected in a circuit 599, which includes the tanks and lines 531, 527b, 525d, 527a and 512. Compressor 521a, which is driven by motor 518a and drive shaft 519a, is connected in series on circuit 599. Compressor 521a acts as a circulatory pump, circulating compressed gas in the circuit 599. This creates the turbulent flow necessary to reduce hotspots from occurring in tanks 511a and 511b due to recompression. Compressed air is introduced into circuit 599 through injection line 525, which is coupled with tank 511b at inlet 528a. Ambient air enters intake filter 513 and flows through line 514 into gas compressor 521. Gas compressor 521 is driven by motor 518 and drive shaft 519. Gas compressor 521 increases the pressure of the gas to flow through injector line 525. Valve 526 enables the operator to close injection line 525 to prevent backflow escape of compressed air out of the circuit 599 during storage phases.

When compressed gas is to be used, valve 535 is opened, allowing the compressed gas in the circuit 599 to flow through compressed gas return line 533 to be used in compressed gas device 538. Most typically, compressed gas device 538 consists of a turbo expander used to generate electrical power. However, compressed gas may also be used for pneumatic tools, gas turbines, or any other use of compressed gas.

Heat energy is removed from circuit 599 through heat exchanger 525a. The head exchanger surrounds line 525d with a coolant supplied from coolant supply line 525c. The coolant is typically water, which removes heat in the heat exchanger, and then flows through coolant return line 525b to a cooling device (not shown). Heat exchanger 525a and compressor 521a are typically operated simultaneously with the operation of compressor 521. In this way, the temperature of the compressed gas in the circuit 599 may be lowered during the filling phase of the circuit. Once the circuit, including tanks 511a and 511b, is sufficiently filled with compressed gas at the desired temperature and pressure, compressors 521 and 521a are shut down, valves 526 and 535 are closed, and the coolant is no longer circulated through heat exchanger 525a. In this storage mode, compressed gas is on hand to be used in the compressed gas consumption device 538.

Tank 511a has inlet 528a and outlet 529a. Tank 511b has inlets 528a and 528c, and outlets 529b and 529c. These inlets and outlets communicate the tanks with the corresponding gas lines seen in FIG. 5.

Figure 6:
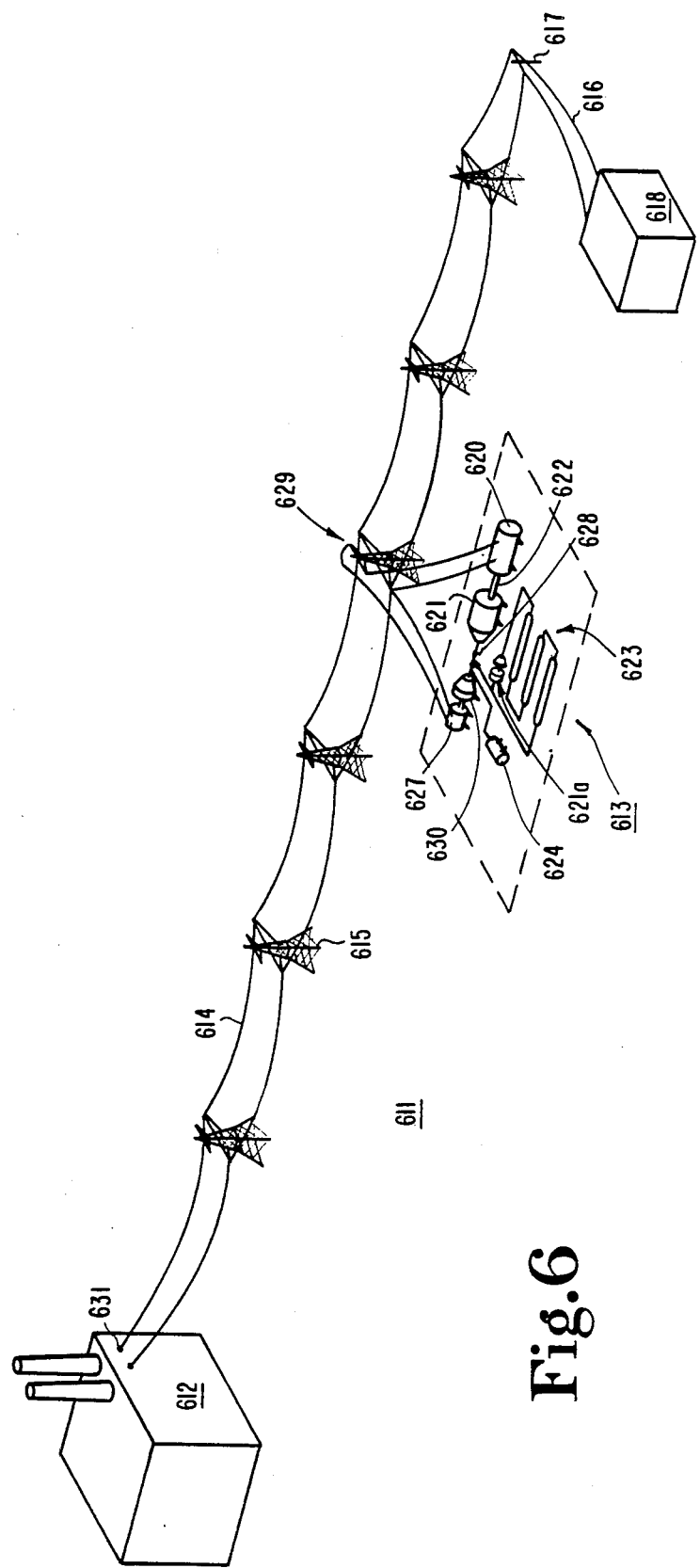
FIG. 6 is an aerial perspective view (not to scale) of one embodiment of the present invention.
Figure 7:
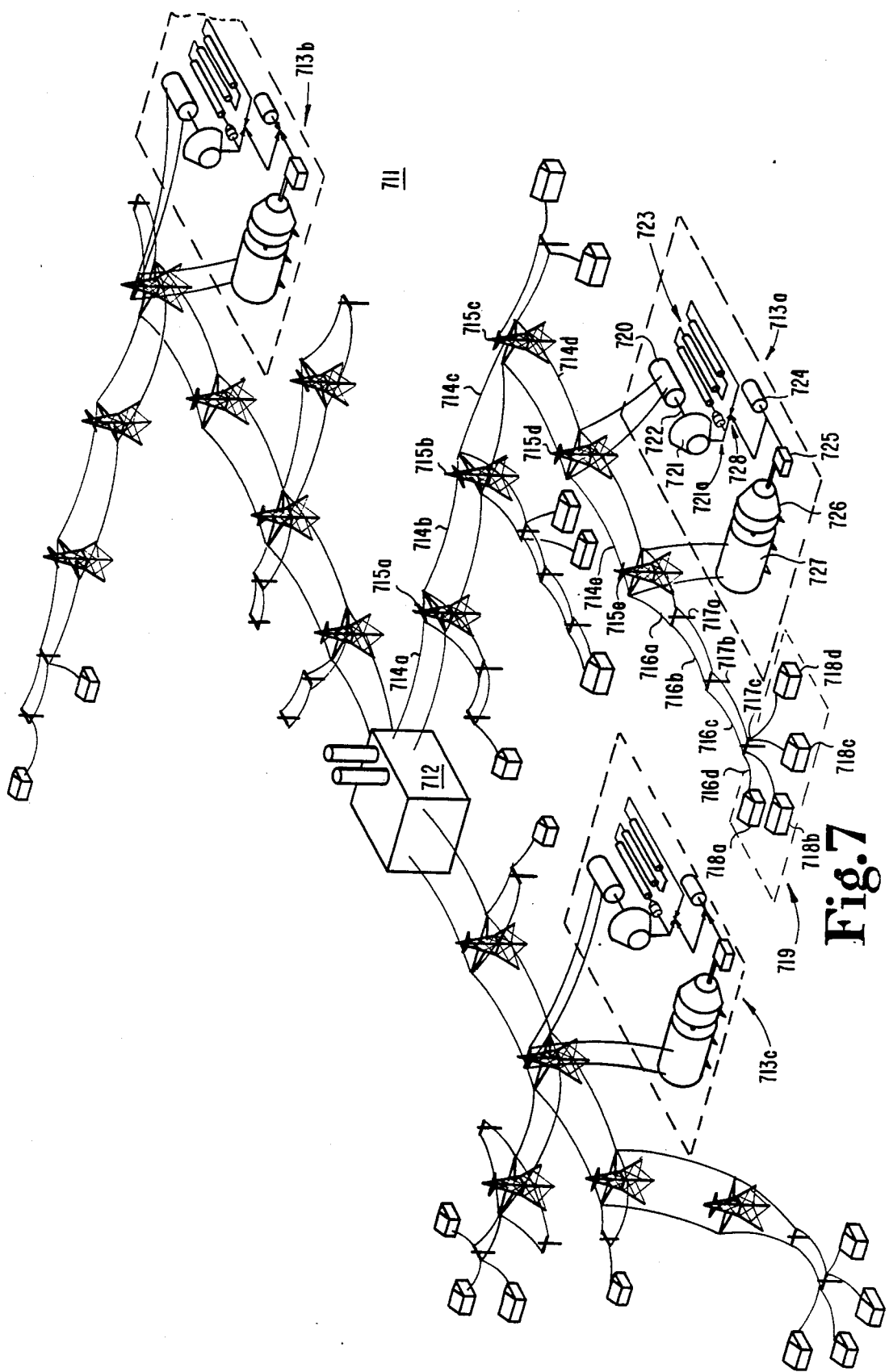
FIG. 7 is an aerial perspective view (not to scale) of an alternative embodiment of the present invention.

Referring now to FIG. 6, like FIG. 7, FIG. 6 is a perspective diagrammatic illustration of the present invention drawn to illustrate the spacial interrelationships of the various aspects of the present invention. FIG. 6 is not drawn to scale.

FIG. 6 shows an arrangement in which baseload electrical generation facility 612 is connected to electricity consumer 618 by way of transmission lines, such as transmission wires 614. Baseload electrical generation facility 612 can comprise a coal powered electric plant, a nuclear power plant having a nuclear reactor, a hydroelectric generation facility or any other facility suitable for producing large quantities of electrical energy for consumption. The baseload electrical generation facility is located a distance apart from electricity consumer 618, both of which are located on geographic area 611. This distance may be as small as a few miles, or as large as several hundred miles, even crossing state lines. Remote power facility 613, as shown, is a simplified illustration of the system as disclosed in FIGS. 1, 2 or 5 in its environment of preferred use. Facility 613 is located between baseload electrical generation facility 612 and electricity consumer 618 along the transmission wires. The satellite power facility is electrically conductively connected to the transmission wires at the satellite-transmission interface 629. The transmission wires 614 are typically strung along transmission towers, such as transmission tower 615, but may also be strung in underground conduits or other means of traversing distances (not shown). The satellite transmission interface is the junction of conductive wires from the satellite power facility to the transmission wires. This involves transforming secondary electrical energy generated at the satellite power facility to a higher voltage using transformers (not shown). In the term "secondary electrical energy", the adjective "secondary" indicates that its source of origin is from a satellite power facility. The satellite power facility has an electric motor 620, which drives an air compressor 621 by way of a drive shaft 622. Compressed air is pumped from air compressors 621 and 621a into air storage tanks 623 for storage. Air from air tanks 623 is combined with fuel from fuel tank 624. This compressed air and fuel mixture is combusted in a combustion chamber (not shown) in turbine engine 630, which drives electromagnetic generator 627. Turbine engine 630 has a combustion chamber within it and turbine engine 630 is interchangeable with a system, as disclosed in FIG. 7, having combustion chamber 25 and turbine 26 separate. Either embodiment will work with the present invention. Flow of compresed gas from air compressor 621 to air storage tanks 623 is regulated by valve 628. Valve 628 may be subsequently opened to allow flow of compressed gas from air storage tanks 623 into turbine engine 630.

The satellite facility is typically operated by powering the electric motor 620 with primary electrical energy from baseload electrical generation facility 612 during low electricity demand periods, thus filling air storage tanks 623 with economically produced compressed air. In the present invention, the adjective "primary" being used to indicate the source of origin of such electricity is from the baseload facility. Secondary electrical energy is generated by electromagnetic generator 627 during high electricity demand periods in which electricity consumer 618 has a high or even peak demand for electrical energy. Satellite power facility 613 is used to boost or step up or increase voltage in the primary electrical energy transmitted from the baseload electrical generation facility 612 to the electricity 618 during these high demand periods. The transmission wires are electrically conductively connected to the baseload electrical generation facility 612 at the baseload-transmission interface 631. The electricity consumer 618 is electrically conductively connected to the transmission wires by distribution means, such as distribution wires 616 and distribution towers 617, which make up an electrical power distribution means. The satellite-transmission interface 629 joins the satellite facility with the transmission wires and is located between the baseload-transmission interface and the distribution wires 616. By so arranging the satellite power facility 613, the present invention can be used to boost transmission of electrical energy across the transmission wires. The satellite transmission facility 613 acts somewhat like a pumping station of electricity, boosting the voltage of primary electrical energy transmitted from the baseload electrical generation facility 612. During generation at the baseload electrical generation facility 612, the electrical energy is transformed by a transformer (not shown) to a higher transmission voltage, which occurs at the generation transmission interface 631. Higher voltages are used because of their greater efficiency and lower line losses during transmission. However, line losses still occur between the baseload-transmission interface 631 and the satellite-transmission interface 629. These line losses are due to lost energy due to impedance in the transmission lines, as well as energy diverted for other electricity consumers (not shown) located between the baseload-transmission interface and the satellite-transmission interface 629. Due to these line losses, electricity consumer 618 may not get its full complement of electrical energy, especially during peak demand periods. Thus, satellite facility 613 acts to boost or step up the voltage and lagging current of the electrical energy being transmitted in the transmission wires. The electromagnetic generator 627 is typically a synchronous alternator which is used to boost the voltage of the primary electricity which is being transmitted. In this way, the voltage and current are put in phase, reducing line loss and magnetism in the power lines.

Referring to FIG. 7, there is a geographic area 711 upon which the present invention is located. FIG. 7 shows a perspective diagrammatic view of the system of the present invention deployed across a geographic area. FIG. 7 is illustrative and not drawn to scale, but rather is intended to convey general spacial interrelationships involved in the present invention.

Baseload electrical generation facility 712 is a facility for the production of electrical energy to be used across geographic area 711. Satellite power facilities 713a, 713b, and 713c, as shown, are simplified illustrations of a system as disclosed in FIGS. 1, 2 or 5. These satellite facilities are geographically distinct from baseload electrical generation facility 712. The geographic distance between baseload electrical generation of facility 712 and, for example, satellite power facility 713a can be as little as a few statute miles or as great as several hundred miles. The baseload electrical generation facility is connected by an electrically conductive transmission system to the satellite power facilities such as satellite power facilities 713a, 713b, and 713c. The transmission system include transmission wires, such as 714a, 714b, 714c, 714d and 714e. Such transmission wires 714a-e are strung between transmission towers, such as transmission towers 715a, 715b, 715c, 715d, and 715e. Typically, such transmission towers are the large steel framed towers commonly seen stretching along the countryside and the transmission wires 714a-e are the high tension or high power lines carried by the transmission towers. Note also, that transmission wires such as 714a-e may also be strung underground in conduits or other systems for traversing distances. The transmission wires 714a-e and the transmission towers 715a-e provide a conduit for transmitting electrical energy across a distance, thus interconnecting a source of electrical power such as a baseload electrical generation facility with a facility needing electrical energy.

Also attached to the transmission system, is a system for distributing electrical power to its end users. Included in this system are distribution wires 716a, 716b, 716c, and 716d, and distribution towers, such as 717a, 717b, and 717c. Typically, the distribution system also includes electrical transformers (not shown) and/or electrical substations (not shown) for stepping down the voltage of the electricity transmitted along the transmission wires 714a-e. The electricity is distributed by the distribution system to electricity consumers, such as 718a, 718b, 718c, and 718d. Such electricity consumers can include, but are not limited to, residential homes, industrial factories, offices, street lights, buildings, and any other facility or device consuming electricity. When electricity consumers, such as 718a-d are clustered in a geographically proximate arrangement, and/or have a higher than average demand for electrical power, a high electricity demand area 719 exits. This typically may occur in a densely populated area having high electricity consumption, as well as industrial areas using large quantities of electricity for their operation.

The satellite power facilities, such as 713a-c, include in the preferred embodiment an electric motor 720 coupled to an air compressor 721, typically by a drive shaft 722. Compressor 721a (like compressor 621a in FIG. 6) circulates compressed air around the air storage circuit. Electricity from the baseload electrical generation facility 712 is transmitted to satellite power facility 713a and used to power electric motor 720 which in turn drives air compressor 721. Air is compressed in the air compressor which fills air storage tanks 723 with compressed air. Electric motor 720 is powered by such primary electrical energy during low demand periods or off-peak periods of electrical demand. Typically, these periods occur during the late night and early morning hours when electrical consumption is at a minimum. During these low electrical demand periods, since the supply of electricity is relatively large and the demand for electricity is relatively small, the cost of primary electrical energy generated during these low demand periods is relatively low. As such, electric motor 720 at satellite power facility 713a is operated relatively inexpensively during these low demand periods. Consequently, the compressed air that is stored in the air storage tanks 723 is generated at a relatively inexpensive cost.

The baseload electrical generation facilities of the present invention are intended to run at near optimal efficiency power generation level, typically within the range of 70% to 90% of rated capacity factor. Peak demand periods are defined as those time periods during which the baseload facility operating at optimal efficiency cannot generate enough power to meet demand. Non-peak demand periods are defined as those time periods which are not peak demand periods.

During high electrical power demand periods, compressed air from the air storage tanks is used to generate electricity to meet the high demand. Compressed air from the air storage tanks is combined with fuel from fuel tank 724. The combination of compressed air and fuel is injected into combustion chamber 725. The compressed air fuel mixture is combusted in the combustion chamber and discharged into the turbine 726. The turbine 726 drives electromagnetic generator 727 which generates secondary electrical energy which is transmitted into and across conductors, such as distribution wire 716a and transmission wire 714e. The fuel to be used in the best mode is believed to be natural gas. However, fuel such as JP-4 and other jet fuels and other combustible fuels are acceptable in the present invention.

Secondary electrical energy generated in electromagnetic generator 727 is typically generated during high electrical demand periods. Typically, these high demand periods occur during normal business hours during the daytime, but may occur at different times depending on the geographic location and nature of the electricity consumers, such as electricity consumers 18a-d. For example, a high electrical demand period may occur in a business district or industrial area during business hours, such as 8 A.M. to 5 P.M., but then shifts to outlying residential areas as people go from work to their homes in the evenings. Electrical demand in industrial areas may likewise vary or may remain relatively constant if the industrial facility is operated 24 hours a day. Not only does electrical demand shift as a function of geography and time on a daily cycle, but also on a weekly and seasonal cycle. Typically, electrical demand in business and industrial areas is greater during the week than on weekends. Also, electrical demand may be high in hot, summer months to power air conditioning units and high in cold, winter months to power heating units.

Note also, that valve 728 may be opened and closed to allow compressed air to flow from the air compressor to air storage tanks during the air compression phase occurring at low demand periods. Valve 728 also can be opened to allow compressed air to flow from air storage tanks 723 to combustion chamber 725 during secondary electrical energy generation phases occurring at high demand periods.

Facilities, such as transmission towers 715a-e and transmission wires 714a-e, distribution towers 717a-c and distribution wires, 716a-d make up an electrical grid network. The electrical grid network services a city or community and its various electricity consumers, such as electricity consumers 718a-d. The electrical grid network interconnects electricity consumers with sources of electrical energy, such as baseload electrical generation facility 712 and satellite power facility 713a. Note finally, that at the baseload electrical generation facility 712, the primary electrical energy generated there is typically transformed to a higher voltage for transmission across the transmission wires. This stepping up of voltage typically occurs in electrical transformers (not shown) at a substation (not shown).

The present invention may include a control system (not shown in drawings) for scheduling generation of secondary electrical energy and for scheduling compressing of air into the tanks. This control system monitors parameters, such as electricity consumption in given areas, power output of the baseload facility, lines losses, air pressures, and air temperature. The system includes a computer linked to these various parameters by communication lines and analog-digital data input devices. The computer processes the data and provides data output as well as sends control signals to digital-analog devices to activate turbines, motors, compressors, absorption chillers, and valves.

Figure 8:
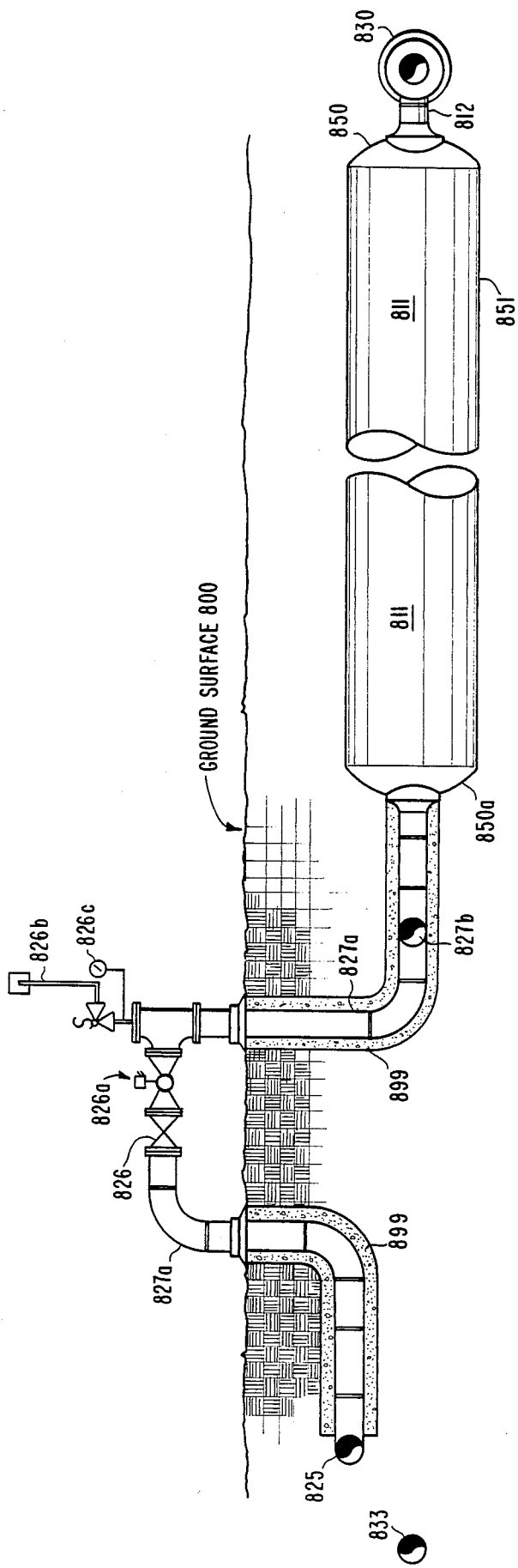
FIG. 8 is a partial side view showing a typical underground storage tank and fittings of the present invention.

Referring now to FIG. 8, storage tank 811 is shown below ground surface 800. FIG. 8 shows a partial detailing of the tank and piping scheme to be used and is substantially similar to tank 11n shown on FIG. 1, and is typical of all tanks of the preferred embodiment. The tank includes tank tube 851 and caps 850 and 850a. Compressed gas is supplied from injection line 825 and flows into line 827a. Line 827a includes isolation valve 826, control valve 826a, safety relief escape 826b, and pressure gauge 826c, and is partially embedded in sand and/or gravel 899. The gas in line 827a flows into tank 811 and or line 827b, which is substantially similar to line 27b of FIG. 1. The gas causes a turbulent flow into the tank and a portion of the gas exits the tank into line 812 and through orifice 830, which is substantially similar to orifice 30d of FIG. 1. The gas continues through a series of tanks and lines (not shown) and then flows into line 833 which is substantially similar to line 33 of FIG. 1. The tanks are surrounded by sand and drainage tiles on a slope and are positioned below the tanks to facilitate drainage. Cathodic protection is afforded using prepackaged magnesium anodes. Note that tanks and lines are to be installed at least 12" away from other underground structures not associated with the line or tank.

Figure 9:
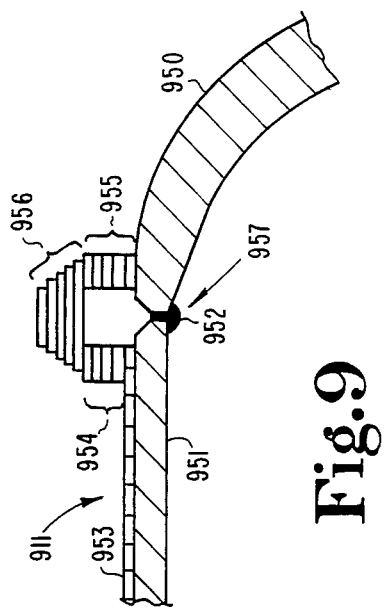
FIG. 9 is a partial side sectional view of a typical storage tank of the present invention.

Referring now to FIG. 9 the structure of forming the preferred high strength, light weight tanks is shown. Cap 950 is partially shown coupled to steel tank tube 951 by gas tungsten arc weld 952. Seam 957 is filled by the weld and reinforced on the outside of tank 911 by field wrapped martinsite steel. The martinsite field wrap includes side wraps 954 and 955, and outer wrap 956, all of which are circumferentially wrapped around the tank tube and the cap. Martinsite wrap 953 is preferably shop wrapped in accordance with U.S. Pat. Nos. 3,880,195 and 3,378,360 as previously incorporated by reference. The preferred wrap is Martinsite M-220 tensile wrap, with a pitch wrap of 0.060"×1.60". The total thickness of the tank wall (tube and wrap) and the wrap thickness are a linear function of the design pressure of the tank. For a 48" diameter storage tank with a storage pressure of 1600 psig, the wrap should be not less than about 0.15 inches and the total thickness of the tank wall should be not less than about 0.4 inches where 60 ksi yield stress steel is used for the tank tube. For a 48" diameter storage tank with a design pressure of about 2800 psig, the wrap should be not less than about 0.233 inches and the total thickness of the tank wall should be not less than about 0.7 inches where 60 ksi steel is used for the tank tube. Sections of tank tubes may be coupled in the field using substantially similar field wrapping.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A compressed gas storage system comprising:
   a gas storage circulating circuit having tank means to store compressed gas in said circuit and having a circuit inlet through which said circuit is filled with gas, said circulating circuit including a tank inlet line coupled to said tank means for supplying compressed gas thereto, and further including a tank outlet line coupled to said tank means for removing compressed gas therefrom, said tank inlet being distinct from said gas outlet line; and
   a first compressor located along said circuit and adapted and arranged to circulate compressed gas around said circuit, said first compressor having a compressor inlet and a compressor outlet, wherein said tank outlet line is coupled to said compressor outlet, and wherein said tank outlet line is coupled to said compressor inlet.

2. The system of claim 1 wherein said gas storage means includes at least one martinsite wrapped storage tank.

3. The system of claim 1 and further comprising a second gas compressor operably coupled to said inlet and adapted and arranged to compress gas into said circuit.

4. The system of claim 3 and further comprising a heat exchanger located along said circuit and adapted and arranged to cool the compressed gas circulating in said circuit.

5. The system of claim 4 wherein said storage means includes a plurality of elongated steel needle tanks connected in series along said circuit.

6. The system of claim 5 and further comprising an outlet to said circuit and a compressed gas consumption means operably coupled to said outlet.

7. The system of claim 6 wherein at least two of said needle tanks are paired in axial alignment with each other.

8. A compressed gas storage system comprising:
a gas storage circuit having means to store compressed gas in said circuit and having an inlet through which said circuit is filled with gas; and
a first compressor located along said circuit and adapted and arranged to circulate compressed gas around said circuit, wherein said gas storage means includes at least one storage tank;
a second gas compressor operably coupled to said inlet and adapted and arranged to compress gas into said circuit;
a heat exchanger located along said circuit and adapted and arranged to cool the compressed gas circulating in said circuit, wherein said first compressor has a first mass flow rate and said second compressor has a second mass flow rate wherein said first mass flow rate is greater than said second mass flow rate.

9. The system of claim 8 wherein said circuit includes a plurality of parallel compressed gas subcircuits.

10. A compressed gas storage system comprising:
a gas storage means having an inlet and an outlet which is located apart from said inlet;
a multi-staged gas compressor train including a first stage, a second stage, a first stage gas intake, and a second stage gas discharge, wherein said first stage and said second stage are connected in series by an interstage connector and wherein said first stage compresses gas from a first pressure to a second pressure and said second stage compresses the gas from said second pressure to a third pressure;
an injection line connected to said gas storage means at said inlet, said injection line communicating said gas storage means with said second stage gas discharge; and
a circulation line which is distinct from said injection line and which is connected to said gas storage means at said outlet, said circulation line communicating said gas storage means with said interstage connector.

11. The system of claim 10 wherein said storage means includes a plurality of storage tanks connected in series by tank connection means, said storage tanks including an intake tank having an inlet and a discharge tank having an outlet.

12. The system of claim 10 and further comprising a heat exchanger operably coupled to aid injection line and adapted and arranged to cool gas flowing through said injection line.

13. A compressed gas storage system comprising:
a gas storage means having an inlet and an outlet;
a multi-staged gas compressor train including a first stage, a second stage, a first stage gas intake, and a second stage gas discharge, wherein said first stage and said second stage are connected in series by an interstage connector and wherein said first stage compresses gas from a first pressure to a second pressure and said second stage compresses the gas from said second pressure to a third pressure;
an injection line connected to said gas storage means at said inlet, said injection line communicating said gas storage means with said second stage gas discharge; and
a circulation line connected to said gas storage means at said outlet, said circulation line communicating said gas storage means with said interstage connector, wherein said storage means includes a plurality of storage tanks connected in series by tank connection means, said storage tanks including an intake tank having an inlet and a discharge tank having an outlet, and wherein said tank connection means includes an expansion valve means.

14. The system of claim 13 and further comprising a compressed gas utility line communicating with said circulation line, whereby compressed gas may be bled off for use in a compressed gas consumption means.

15. The system of claim 14 wherein said storage tanks are elongated needle tanks and wherein at least a pair of said needle tanks are axially aligned and coupled to a common tank connection means.

16. The system of claim 15 and further comprising a check valve located between said outlet and said interstage connector and oriented to prevent gas flow toward said discharge tank.

17. The system of claim 16 and further comprising a heat exchanger operably coupled to said injection line and adapted and arranged to cool gas flowing through said injection line.

18. The system of claim 17 wherein said third pressure is approximately two thousand pounds per square inch.

19. A compressed gas storage system comprising:
a plurality of gas storage tanks, each of said tanks having an intake end and a discharge end, said tanks being connected in series between their respective intake and discharge ends, one of said tanks being an intake tank and another of said tanks being a discharge tank;
a compressed gas supply means including a compressed gas discharge;
an injection line connected to said intake tank at said intake end, said injection line communicating said intake tank with said compressed gas discharge; and
a circulation line which is distinct from said injection line and which is connected to said discharge tank at said discharge end;
a compressed gas consumption means, said circulation line communicating said discharge tank with said compressed gas consumption means.

20. The system of claim 19 wherein said gas supply means includes a first gas compressor.

21. The system of claim 20 wherein said compressed gas supply means includes a second gas compressor.

22. The system of claim 19 wherein said gas consumption means includes a turbine combustion chamber.

23. The method of storing compressed gas using turbulent gas flow comprising the steps of:
(a) compressing a gas in a first stage gas compressor;
(b) further compressing the gas in a second stage gas compressor;
(c) filling a gas storage means with the further compressed gas; and
(d) simultaneously with said filling step, circulating a portion of the further compressed gas in said gas storage means back to said second stage gas compressor for further compression.

24. The method of claim 23 wherein said gas storage means includes a plurality of elongated needle tanks connected in series and wherein said circulating step includes the step of turbulently flowing the further compressed gas through said plurality of elongated needle tanks.

25. An improved method of storing compressed gas using turbulent gas flow comprising the steps of:
 (a) filling a gas storage means with compressed gas, said gas storage means having an intake end and a discharge end, said filling step occurring at said intake end; and
 (b) creating a flow of compressed gas through said gas storage means by bleeding a portion of the compressed gas in said gas storage means from an outlet at said discharge end, said bleeding occurring simultaneously with said filling step.

26. The method of claim 25 and further comprising the step of cooling the compressed gas flowing through said gas storage means with a heat exchanger, said cooling step occurring simultaneously with said filling step.

27. The method of claim 26 and further comprising the step of utilizing the gas bled from said outlet in a gas consumption means, and wherein said creating step includes the step of flowing the compressed gas along a plurality of series connected elongated needle tanks.

28. The method of claim 27 wherein said utilizing step includes the step of feeding the gas bled from said outlet into a turbine combustion chamber.

29. The method of claim 27 wherein said utilizing step includes the step of feeding the gas bled from said outlet into a gas compressor.

30. An improved system for transmitting and distributing electrical power from a baseload electrical power generation facility to electricity consumers comprising:
 an electrical grid network connected to the baseload electrical generation facility at a baseload-grid interface, said electrical grid network carrying primary electrical energy and having means for electricity consumers to connect to said electrical grid network;
 a satellite power facility connected to said electrical grid network at a satellite-grid interface and being a geographically distinct facility from the baseload electrical power generation facility, wherein said satellite facility includes means to convert said primary electrical energy from said electrical grid network into mechanical energy in the form of compressed air, said satellite facility further including geologically independent compressed air storage means including a plurality of gas storage tanks, each of said tanks having an intake end and a discharge end, said tanks being connected in series between their respective intake and discharge ends, one of said tanks being an intake tank coupled to said means to convert to mechanical energy and another of said tanks being a discharge tank, and means for converting said mechanical energy into secondary electrical energy, whereby said secondary electrical energy is transmitted across said electrical grid network to provide secondary electrical energy to electricity consumers.

31. The system of claim 30 wherein said storage means includes a plurality of elongated needle tanks, and wherein electricity consumers have peak electricity demand periods and wherein said secondary electrical energy is transmitted from said satellite power facility across said grid network during said peak electricity demand periods.

32. The system of claim 31 wherein electricity consumers have non-peak electricity demand periods and wherein said primary electrical energy is converted to said mechanical energy in said satellite facility during said non-peak electricity demand periods.

33. The system of claim 32 wherein said means for converting primary electrical energy into mechanical energy includes an air compressor driven by an electric motor, said air compressor providing compressed air for storage in said needle tanks, said needle tanks being connected in series.

34. The system of claim 33 wherein said means for converting mechanical energy into secondary electrical energy includes an electromagnetic generator driven by a turbine engine, said turbine engine having a combustion chamber wherein said compressed air is combined with a fuel to provide combustion to drive said turbine engine, and wherein said satellite power facility includes means for scheduling the transmission of said secondary electrical energy from said satellite power facility across said grid network to correspond with said peak electricity demand periods of the electricity consumers connected to said grid network.

35. The system of claim 34 and further comprising a high electricity demand area serviced by said grid network, said satellite power facility located geographically proximate to said high electricity demand areas.

36. The system of claim 35 wherein said electric motor is powered by alternating current and wherein said electromagnetic generator generates direct current.

37. The system of claim 35 wherein said electric motor is powered by direct current and wherein said electromagnetic generator generates alternating current.

38. The system of claim 31 wherein said secondary electrical energy is transmitted across said electrical grid network at a voltage greater than four thousand volts, and wherein said satellite power facility is located a distance greater than twenty statute miles from said baseload electrical generation facility.

39. An improved system for transmitting and distributing electrical power from a baseload electrical power generation facility to electricity consumers comprising:
 an electrical grid network connected to the baseload electrical generation facility at a baseload-grid interface, said electrical grid network carrying primary electrical energy and having means for electricity consumers to connect to said electrical grid network;
 a satellite power facility connected to said electrical grid network at a satellite-grid interface and being a geographically distinct facility from the baseload electrical power generation facility, wherein said satellite facility includes means to convert said primary electrical energy from said electrical grid network into mechanical energy in the form of compressed air, said satellite facility further including geologically independent compressed air storage means and means for converting said mechanical energy into secondary electrical energy, whereby said secondary electrical energy is transmitted across said electrical grid network to provide secondary electrical energy to electricity consumers, wherein said storage means includes a plurality of elongated needle tanks, and wherein electricity consumers have peak electricity demand periods and wherein said secondary electrical energy is transmitted from said satellite power facility across said grid network during said peak electricity demand periods, wherein electricity consumers have non-peak electricity demand periods and wherein said primary electrical energy is converted to said mechanical energy in said satellite facility during said non-peak electricity demand periods, wherein said means for converting primary electrical energy into mechanical energy includes an air compressor driven by an electric motor, said air compressor providing compressed air for storage in said needle tanks, said needle tanks being connected in series, wherein said means for converting mechanical energy into secondary electrical energy includes an electromagnetic generator driven by a turbine engine, said turbine engine having a combustion chamber. wherein said compressed air is combined with a fuel to provide combustion to drive said turbine engine, and wherein said satellite power facility includes means for scheduling the transmission of said secondary electrical energy from said satellite power facility across said grid network to correspond with said peak electricity demand periods of the electricity consumers connected to said grid network;
a high electricity demand area serviced by said grid network said satellite power facility located geographically proximate to said high electricity demand areas, wherein said elongated needle tanks are martinsite wrapped.

40. A compressed air energy storage system for use in generating, transmitting and distributing electrical power to consumers coupled to a primary electrical energy generating baseload power facility by an electrical grid, the consumers having peak and non-peak electricity demand periods comprising;
a satellite power facility including first means for converting the primary electrical energy from the electrical grid network into mechanical energy in the form of compressed air, said first means including a gas storage circulating circuit having tank means for storing compressed gas in said circuit and having an inlet through which said circuit is filled with air, said circulating circuit including a tank inlet line coupled to said tank means for supplying compressed gas thereto, and further including a tank outlet line coupled to said tank means for removing compressed gas therefrom, said tank inlet line being distinct from said gas outlet line, said satellite power facility further including a first compressor located along said circuit and adapted and arranged to circulate said compressed air around said circuit, said first compressor having a compressor inlet and a compressor outlet, wherein said tank inlet line is coupled to said compressor outlet, and wherein said tank outlet line is coupled to said compressor inlet, said satellite facility further including second means for converting said mechanical energy into secondary electrical energy, whereby said secondary electrical energy is transmitted across the electrical grid network to provide secondary electricity energy to electricity consumers; and
means for electrically connecting said satellite power facility to said grid network.

41. The system of claim 40 and further including air storage tanks, said storage tanks being geologically independent.

42. The system of claim 41 wherein said first means for converting primary electrical energy into mechanical energy includes an air compressor driven by an electric motor, said air compressor providing compressed air for storage in said air tanks, and wherein said air tanks are elongated needle tanks connected in series.

43. A compressed air energy storage system for use in generating, transmitting and distributing electrical power to consumers coupled to a primary electrical energy generating baseload power facility by an electrical grid, the consumers having peak and non-peak electricity demand periods comprising:
a satellite power facility including first means for converting the primary electrical energy from the electrical grid network into mechanical energy in the form of compressed air, said first means including a gas storage circuit having means for storing compressed gas in said circuit and having an inlet through which said circuit is filled with air and further including a first compressor located along said circuit and adapted and arranged to circulate said compressed air around said circuit, said satellite facility further including second means for converting said mechanical energy into secondary electrical energy, whereby said secondary electrical energy is transmitted across the electrical grid network to provide secondary electrical energy to electricity consumers; and
means for electrically connecting said satellite power facility to said grid network;
air storage tanks, said storage tanks being geologically independent, wherein said first means for converting primary electrical energy into mechanical energy includes an air compressor driven by an electric motor, said air compressor providing compressed air for storage in said air tanks, and wherein said air tanks are elongated needle tanks connected in series, wherein said means for converting mechanical energy into secondary electrical energy includes an electromagnetic generator driven by a turbine engine, said turbine engine having a combustion chamber wherein said compressed air is combined with a fuel to provide combustion to drive said turbine engine, and wherein said elongated needle tanks are martinsite wrapped.

44. The system of claim 43 wherein said satellite power facility is located geographically proximate to a high electricity demand area.

45. The system of claim 43 and further comprising a plurality of satellite power facilities, wherein said satellite power facilities includes means for scheduling the transmission of said secondary electrical energy from said satellite power facilities across the grid network to correspond with the peak electricity demand periods of the consumers.

46. An improved method for generation and distribution of electrical power across a grid network to electricity consumers comprising the steps of:
(a) generating primary electrical power at a baseload electrical power generation facility;
(b) transmitting said primary electrical power across an electrical grid network;
(c) powering an electric motor at a satellite power facility with a portion of said primary electrical power, said satellite facility being a geographically distinct facility from said baseload electrical generation facility;

(d) driving an air compressor with said electric motor;

(e) compressing air with said air compressor;

(f) circulating a portion of said air back to said air compressor during said compressing step;

(g) storing said compressed air in a storage means;

(h) retrieving said compressed air from said storage means;

(i) expanding said compressed air in a turbine engine;

(j) driving an electromagnetic generator with said turbine engine;

(j) generating secondary electrical power by said electromagnetic generator; and (k) transmitting said secondary electrical power across said electrical grid network.

47. The method of claim 46 wherein electricity consumers have a peak electricity demand period and a non-peak electricity demand period, and wherein said transmitting of secondary electrical power step occurs during said peak electricity demand period and said compressing step occurs during said non-peak electricity demand periods.

48. The method of claim 47 wherein said storing step further includes the step of filling geologically independent storage tanks with said compressed air, and wherein said expanding step further comprises the steps of:

(a) combining into a mixture said compressed air with a fuel;

(b) combusting said mixture in a combustion chamber; and (c) discharging said combusted mixture in said turbine engine.

49. An improved compresed air energy storage system for stepping up voltage of electricity transmitted to electricity consumers comprising:

electrical energy including primary electrical energy and secondary electrical energy;

a baseload electrical generation facility generating said primary electrical energy;

means for transmitting electricity being connected to said baseload electrical generation facility at a baseload-transmission interface;

means for distributing electrical energy to electricity consumers, said distributing means connected to said means for transmitting;

a satellite power facility connected to said means for transmitting at a satellite-transmission interface, said satellite-transmission interface located between said baseload-transmission interface and said distribution means, wherein said primary electrical energy has a transmission voltage and a dropped voltage, said transmission voltage occurring at said baseload-transmission interface, said satellite facility including first means for storing mechanical energy in the form of compressed air, said satellite facility further including second means for converting said mechanical energy into said secondary electrical energy, whereby said secondary electrical energy is added to said primary electrical energy at said satellite-transmission interface to step up said dropped voltage of said primary electrical energy.

50. The system of claim 49 and further comprising a non-peak electricity demand period and a peak electricity demand period, wherein the electricity consumers have a variable demand for said electrical energy, wherein during said non-peak electricity demand period the variable demand is less than the variable demand during said peak electricity demand period, and wherein said dropped voltage is stepped up during said peak electricity demand period, and wherein said storage means includes geologically independent air storage tanks.

51. The system of claim 50 wherein said primary electrical energy is converted to said mechanical energy at said satellite facility during said non-peak electricity demand period, and wherein said baseload-transmission interface and said means for distributing are located a first distance greater than fifty statute miles apart, wherein said satellite power facility is located a second distance greater than twenty statute miles away from said baseload electrical generation facility, and wherein said generation voltage is greater than four thousand volts.

52. The system of claim 51 wherein said geologically independent storage tanks are martinsite wrapped elongated needle tanks.

53. An improved method for stepping up dropped voltage of electrical energy generated for and transmitted to an electricity consumer comprising the steps of:

(a) generating primary electrical energy at a baseload electrical generation facility during a non-peak electricity demand period, said baseload electrical generation facility connected to a transmission means at a baseload-transmission interface and said transmission means connected to the electricity consumer by a distribution means:

(b) transmitting said primary electrical energy across said transmission means to a satellite power facility connected to said transmission means at a satellite-transmission interface, said satellite-transmission interface located along said transmission means and between said baseload electrical generation facility and the electricity consumer, said transmitting step occurring during said non-peak electricity demand period:

(c) powering an electric motor with a portion of said primary electrical power at said satellite power facility;

(d) driving an air compressor with said electric motor;

(e) compressing air with said air compressor;

(f) storing said compressed air in storage means;

(g) retrieving said compressed air from said storage means;

(h) expanding said compressed air in a turbine engine;

(i) driving an electromagnetic generator with said turbine engine;

(j) generating secondary electrical energy by said electromagnetic generator; and (k) further generating primary electrical energy at said baseload electrical generation facility during a peak demand period, said further generated primary electrical energy having an initial transmission voltage at said baseload-transmission interface;

(l) transmitting said further generated primary electrical energy across said transmission means to the electricity consumer;

(m) dropping said initial transmission voltage across said transmission means to a dropped voltage, said dropped voltage occurring at said satellite-transmission interface; and (n) stepping up said dropped voltage to a stepped up voltage at said satellite-transmission interface with said secondary electrical energy.

54. The method of claim 53 wherein said transmission means is at least twenty statute miles in length and wherein said dropping step further includes the step of impeding said primary electrical energy along said transmission means.

55. The method of claim 54 wherein said initial transmission voltage is greater than four thousand volts.

56. The method of claim 53 wherein said storing step further includes the step of injecting said air into at least one geologically independent storage tank.

57. The method of claim 56 wherein said storing step further includes the step of circulating a flow of air through a series of elongated needle tanks.

* * * * *